US012234767B2

(12) United States Patent
Pellerin (10) Patent No.: US 12,234,767 B2
(45) Date of Patent: Feb. 25, 2025

(54) LUBRICATION SYSTEM WITH PUMP FEED FROM DE-AERATOR

(71) Applicant: Pratt & Whitney Canada Corp., Longueuil (CA)

(72) Inventor: Hugues Pellerin, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/129,609

(22) Filed: Mar. 31, 2023

(65) Prior Publication Data

US 2024/0328352 A1 Oct. 3, 2024

(51) Int. Cl.
*F02C 7/06* (2006.01)

(52) U.S. Cl.
CPC ............ *F02C 7/06* (2013.01); *F05D 2260/98* (2013.01)

(58) Field of Classification Search
CPC ...... F02C 7/06; F05D 2260/98; F16N 39/002; F01M 1/10; F01M 1/12; F01M 2001/123; F01M 11/004; F01M 11/02; F01M 11/08
See application file for complete search history.

(56) References Cited

U.S. PATENT DOCUMENTS

| 4,090,820 | A | * | 5/1978 | Teruyama | ............ F04C 15/0088 418/79 |
| 8,500,869 | B1 | | 8/2013 | Johnson | |
| 8,601,785 | B2 | | 12/2013 | Legare | |
| 8,672,095 | B2 | | 3/2014 | Charier | |
| 11,459,952 | B2 | | 10/2022 | Rendina | |
| 2018/0156116 | A1 | | 6/2018 | Teicholz | |
| 2020/0191054 | A1 | | 6/2020 | Parnin | |
| 2021/0254506 | A1 | * | 8/2021 | Legare | ...................... F16N 7/38 |

OTHER PUBLICATIONS

EP Search Report for EP Patent Application No. 24167073.6 dated Sep. 3, 2024.

* cited by examiner

*Primary Examiner* — Loren C Edwards
(74) *Attorney, Agent, or Firm* — Getz Balich LLC (57) ABSTRACT

An aircraft engine lubrication system for an aircraft engine having a first component (FC) and a second component (SC) is provided. The system includes a lubricant tank (LT), a first pump (FP), a second pump (SP), and a de-aerator (DA). The LT outlet is in fluid communication with a FP inlet. The FP outlet is in fluid communication with a SP inlet. The SP outlet is in fluid communication with a FC inlet and the SC inlet. The SC outlet is in fluid communication with a LT first inlet. The DA gas outlet is in fluid communication with a LT second inlet. The DA liquid outlet is in fluid communication with a SP inlet.

11 Claims, 5 Drawing Sheets

LUBRICATION SYSTEM WITH PUMP FEED FROM DE-AERATOR

BACKGROUND OF THE INVENTION

1. Technical Field

The present disclosure relates gas turbine engines in general and to de-aerator systems for use with gas turbine engines in particular.

2. Background Information

Figure 1:
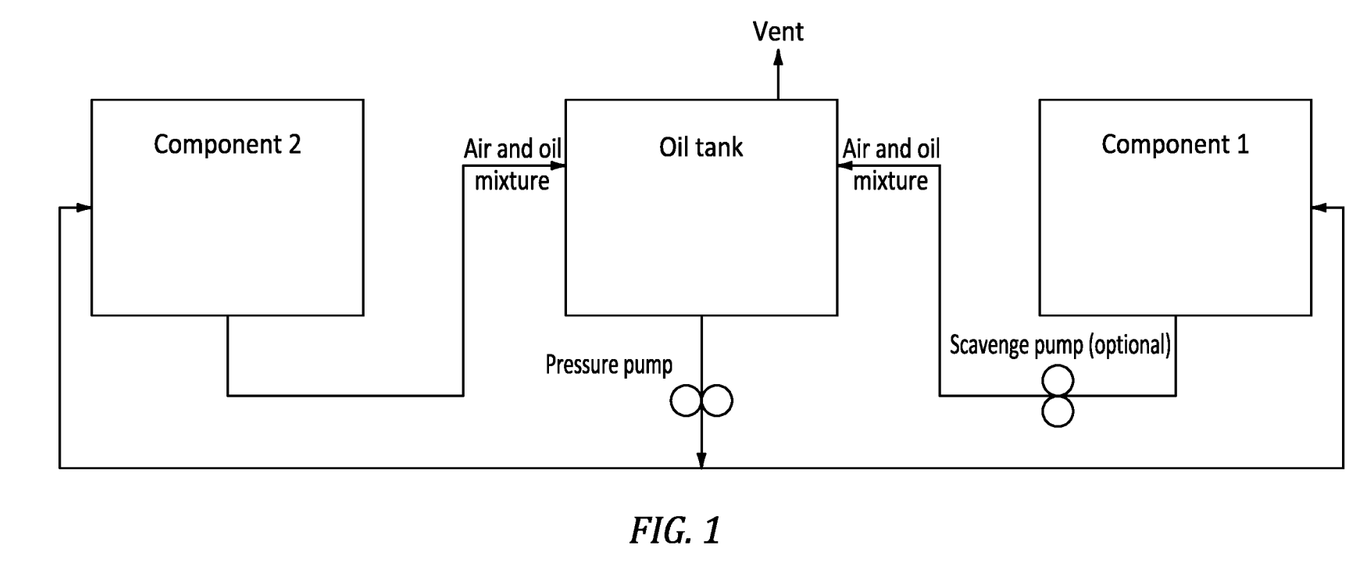
FIG. 1 is a diagrammatic illustration of a lubrication system embodiment.
Figure 2:
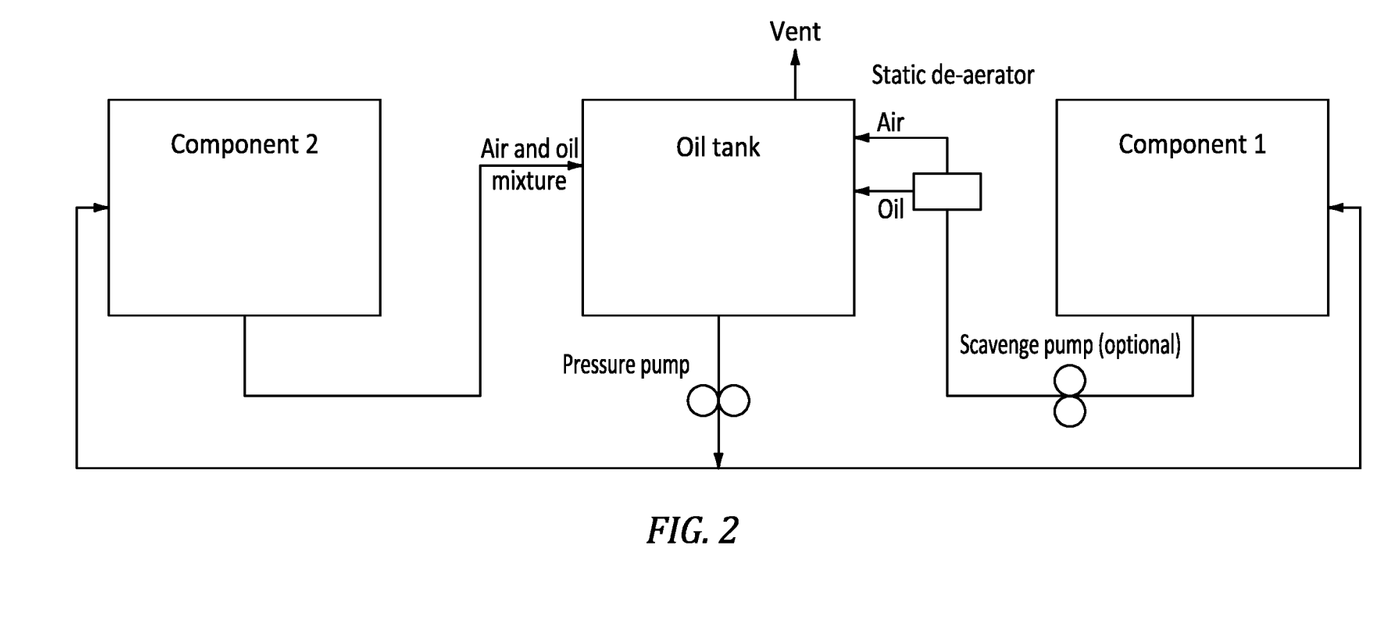
FIG. 2 is a diagrammatic illustration of a lubrication system embodiment.

Aircraft engine oil systems are designed to lubricate and cool components that engage and disengage, such as gears, bearings, and journal bearings or static elements such as internal cavity walls to avoid overheating. To accomplish these functions, oil is typically circulated through an oil tank, a pressure oil pump, one or more cavities containing the components requiring oil, and then back to the oil tank. During this cycle, air migrates into the oil, either mechanically or by a pressure differential. The oil returned to the tank must then dwell for a given time to let air evacuate from the oil before the cycle is repeated. FIG. 1 schematically shows such an oil system. A system like that shown in FIG. 1 suffers from two main disadvantages. First, an extra mass of oil is carried with the engine to "rest" in the oil tank during the mission, making the engine heavier. To reduce dwell time, and therefore system mass, some oil systems integrate a passive de-aerator in which air and oil are partially separated before being returned to the oil tank using centrifugal acceleration in a curved path; e.g., see FIG. 2. Though an improvement, air may remain in the de-aerator oil return to tank.

What is needed is an improved system for lubricant de-aeration.

SUMMARY

According to an aspect of the present disclosure, an aircraft engine lubrication system for an aircraft engine having a first component (FC) with an FC inlet and an FC outlet, and a second component (SC) having a SC inlet and a SC outlet is provided. The system includes a lubricant tank (LT), a first pump (FP), a second pump (SP), and a de-aerator (DA). The lubricant tank is configured to contain a volume of lubricant. The lubricant tank has a LT first inlet, a LT second inlet, and a LT outlet. The first pump has a FP inlet and a FP outlet. The second pump has a SP inlet and a SP outlet. The de-aerator has a DA inlet, a DA gas outlet, and a DA liquid outlet. The LT outlet is in fluid communication with the FP inlet. The FP outlet is in fluid communication with the SP inlet. The SP outlet is in fluid communication with the FC inlet and the SC inlet such that lubricant exiting the second pump passes to the first component and to the second component. The SC outlet is in fluid communication with the LT first inlet such that lubricant exiting the second component passes to the lubricant tank. The FC outlet is in fluid communication with the de-aerator. The DA gas outlet is in fluid communication with the LT second inlet such that gas exiting the de-aerator passes to the lubricant tank. The DA liquid outlet is in fluid communication with the SP inlet such that the lubricant exiting the de-aerator passes to the second pump, bypassing the lubricant tank.

In any of the aspects or embodiments described above and herein, the de-aerator may be a static de-aerator or an active de-aerator.

In any of the aspects or embodiments described above and herein, the second pump may be a positive displacement pump.

In any of the aspects or embodiments described above and herein, the system may include a scavenge pump in fluid communication with the FC outlet and the DA inlet such that lubricant flows from the FC outlet through the scavenge pump to the DA inlet.

In any of the aspects or embodiments described above and herein, a fluid line may extend between the FP outlet and the SP inlet, and the DA liquid outlet may be is in fluid communication with the fluid line.

According to another aspect of the present disclosure, an aircraft engine lubrication system for an aircraft engine having a first component (FC) with an FC inlet and an FC outlet, and a second component (SC) having a SC inlet and a SC outlet is provided. The system includes a lubricant tank, a first pump (FP), a second pump (SP), a pressure regulating valve (PRV), a first de-aerator (FDA), and a second de-aerator (SDA). The lubricant tank is configured to contain a volume of lubricant. The lubricant tank has an LT outlet. The first pump has a FP inlet and a FP outlet. The second pump has a SP inlet and a SP outlet. The first de-aerator has an FDA inlet, an FDA gas outlet, and an FDA liquid outlet. The second de-aerator has an SDA inlet, an SDA gas outlet, and a SDA liquid outlet. The LT outlet is in fluid communication with the FP inlet, the FP outlet is in fluid communication with the SP inlet, and the SP outlet is in fluid communication with the FC inlet and the SC inlet such that lubricant exiting the second pump passes to the first component and to the second component. The PRV is disposed across the second pump and is in fluid communication with the first pump. The SC outlet is in fluid communication with the SDA inlet. The SDA gas outlet and the SDA liquid outlet are in fluid communication with the lubricant tank, such that lubricant exiting the second component passes to the lubricant tank. The FC outlet is in fluid communication with the FDA inlet. The FDA gas outlet is in fluid communication with the lubricant tank such that gas exiting the first de-aerator passes to the lubricant tank. The FDA liquid outlet is in fluid communication with the first pump such that the lubricant exiting the first de-aerator passes to the first pump, bypassing the lubricant tank.

In any of the aspects or embodiments described above and herein, the system may include an oil delay valve disposed in-line downstream of the SP outlet.

In any of the aspects or embodiments described above and herein, the oil delay valve may be disposed in-line between the second pump and the second component.

In any of the aspects or embodiments described above and herein, the oil delay valve may be disposed in-line between the second pump and the first component and the second component.

In any of the aspects or embodiments described above and herein, the system may include a first scavenge pump in fluid communication with the FC outlet and the first de-aerator.

In any of the aspects or embodiments described above and herein, the system may include a first blowdown valve in fluid communication with a first fluid line in communication with the FDA inlet and a second fluid line in communication with the lubricant tank.

In any of the aspects or embodiments described above and herein, the system may include a second scavenge pump in fluid communication with the SC outlet and the second de-aerator.

In any of the aspects or embodiments described above and herein, the system may include a second blowdown valve in fluid communication with a third fluid line and the lubricant tank, the third fluid line in fluid communication SC inlet and the second de-aerator.

In any of the aspects or embodiments described above and herein, the first pump may be a jet pump and the PRV may be in fluid communication with a first FP inlet and the SDA liquid outlet may be in fluid communication with a second FP inlet.

According to an aspect of the present disclosure, a method of selectively operating an aircraft engine lubrication system having a vented lubricant tank is provided. The method includes: pumping lubricant from the lubricant tank using a first pump, and pumping the lubricant to a second pump from the first pump; using the second pump to pump the lubricant to a first component (FC) and to a second component (SC); returning the lubricant from the second component to the lubricant tank; directing the lubricant from the first component to a first de-aerator (FDA); using the first de-aerator to separate the lubricant into an FDA gas component and an FDA liquid component; directing the separated FDA gas component to the lubricant tank; and directing the separated FDA liquid component to an inlet of the second pump, bypassing the lubricant tank.

In any of the aspects or embodiments described above and herein, a quasi-closed lubricant loop for the first component may be formed by the second pump pumping the lubricant to the first component, directing the lubricant from the first component to the first de-aerator, and directing the separated FDA liquid component to the inlet of the second pump.

In any of the aspects or embodiments described above and herein, the step of returning the lubricant from the second component to the lubricant tank may include passing the lubricant from the second component through a second de-aerator.

In any of the aspects or embodiments described above and herein, the method may include selectively operating an oil delay valve in an open configuration or a closed configuration, wherein in the open configuration lubricant from the second pump passes from the second pump to the second component, and wherein in the closed configuration lubricant from the second pump does not pass from the second pump to the second component.

In any of the aspects or embodiments described above and herein, operating the oil delay valve in a closed configuration may produce a quasi-closed lubricant loop for the first component.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

The present disclosure is directed to an aircraft engine lubrication system configured to provide a lubricant (e.g., "oil") that functions to lubricate and cool engine components such as gears, bearings, and journal bearings or static elements such as internal cavity walls to avoid overheating. Embodiments of the present disclosure system are configured such that a portion of the system oil is passed through the de-aerator during a given flow cycle and the remainder of the oil is passed back to the oil tank.

Figure 3:
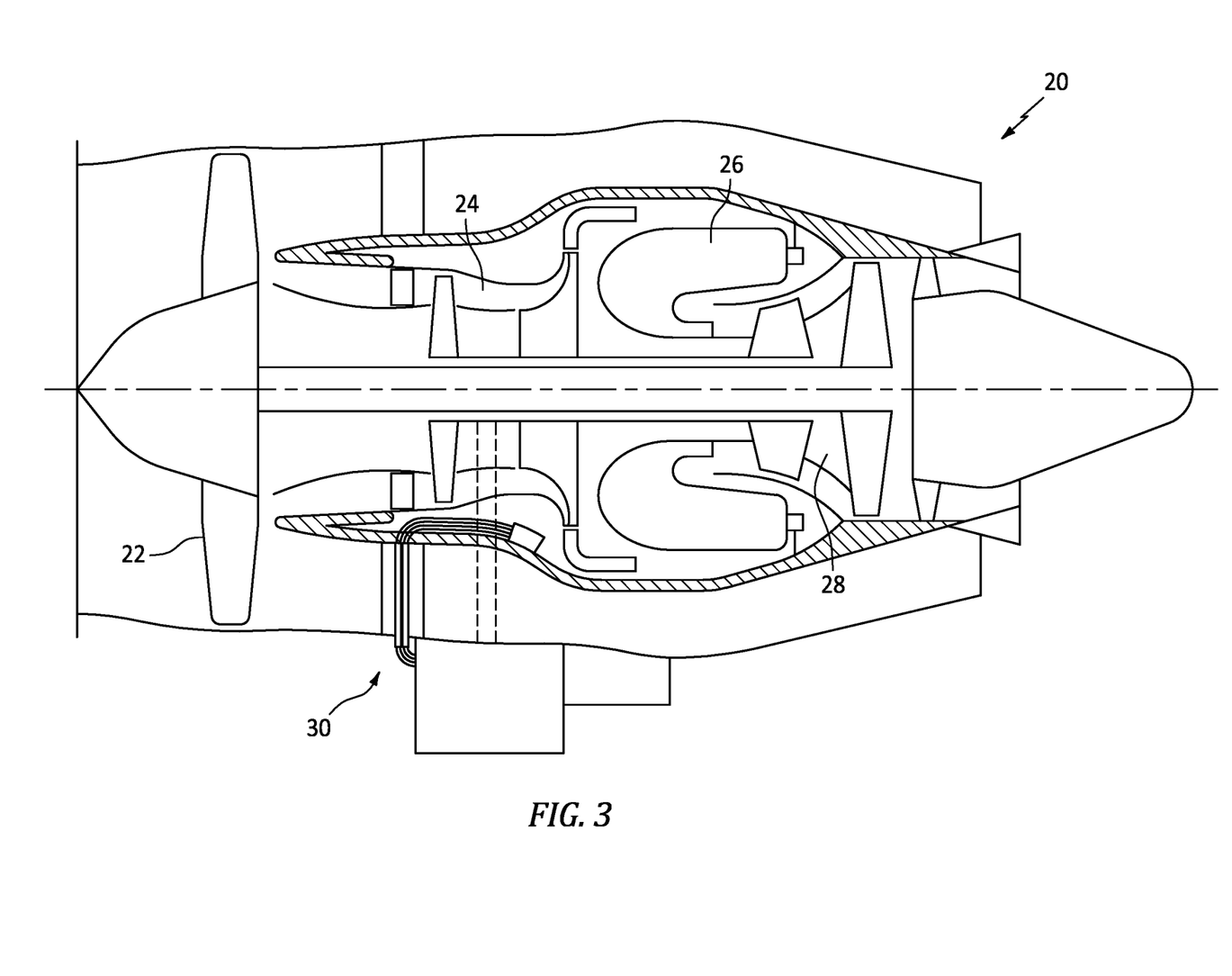
FIG. 3 is a diagrammatic illustration of a gas turbine engine embodiment.

FIG. 3 illustrates a gas turbine engine 20 that includes in serial flow communication a fan 22 through which ambient air is propelled, a compressor section 24 for pressurizing the air, a combustor 26 in which the compressed air is mixed with fuel and ignited for generating an annular stream of hot combustion gases, and a turbine section 28 for extracting energy from the combustion gases. The present disclosure may be used within conventional through-flow or reverse flow gas turbine engines, gas turbine engine types such as turbofan engines, turboprop engines, turboshaft engines, and internal combustion engines as well.

The engine 20 further comprises one or more fluid systems, such as a lubrication system 30 that circulates lubricant to both lubricate and cool components; e.g., bearings, gears (e.g., within a gearbox), and other components. As will be detailed herein, a lubrication system 30 may include a number of different components including a lubricant pump, a lubricant tank, a de-aerator, a scavenge pump and the like. Embodiments of the present disclosure system 30, including the lubrication system components that may be included in each, are detailed hereinafter.

Figure 4:
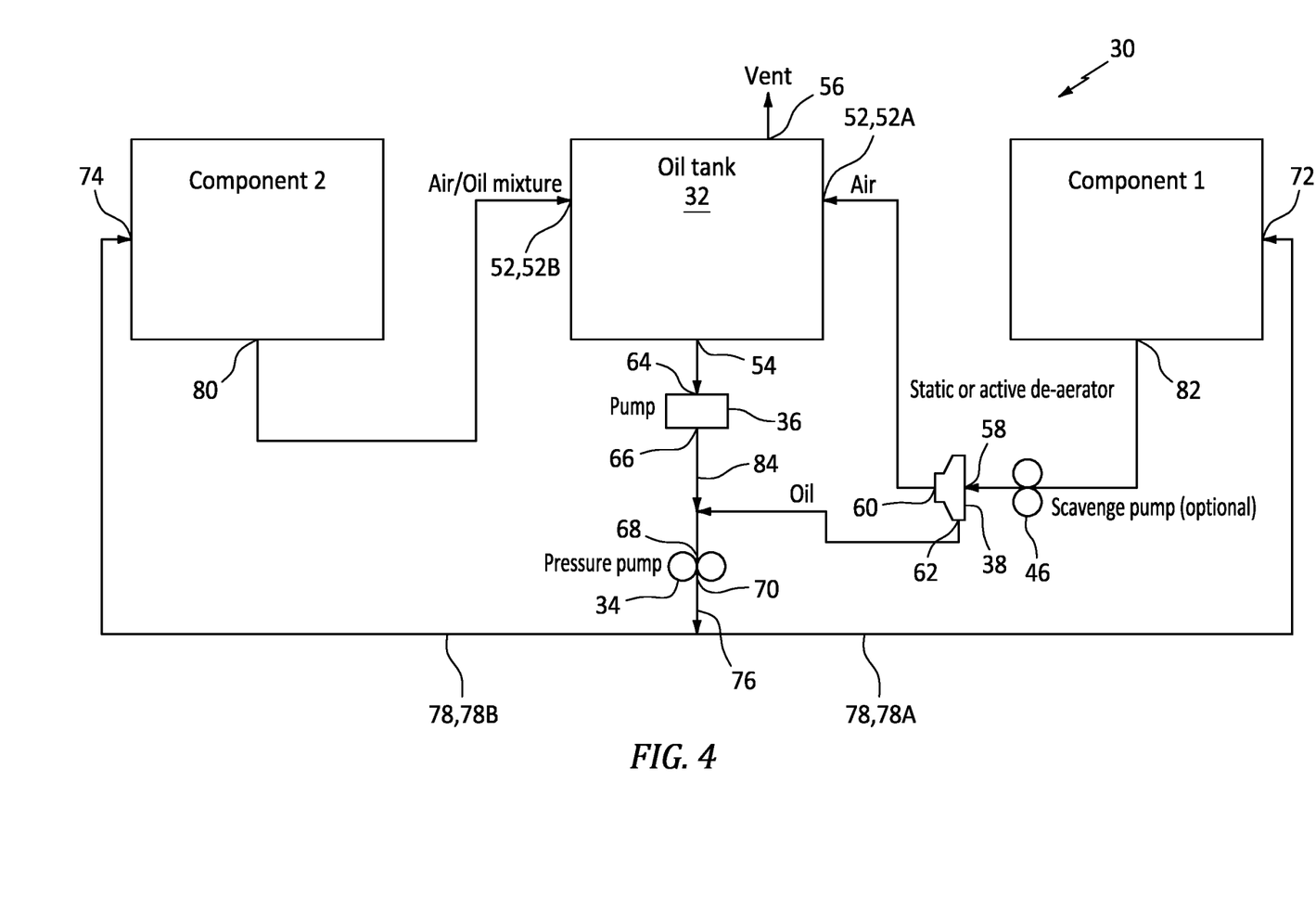
FIG. 4 is a diagrammatic illustration of a present disclosure lubrication system embodiment.
Figure 5:
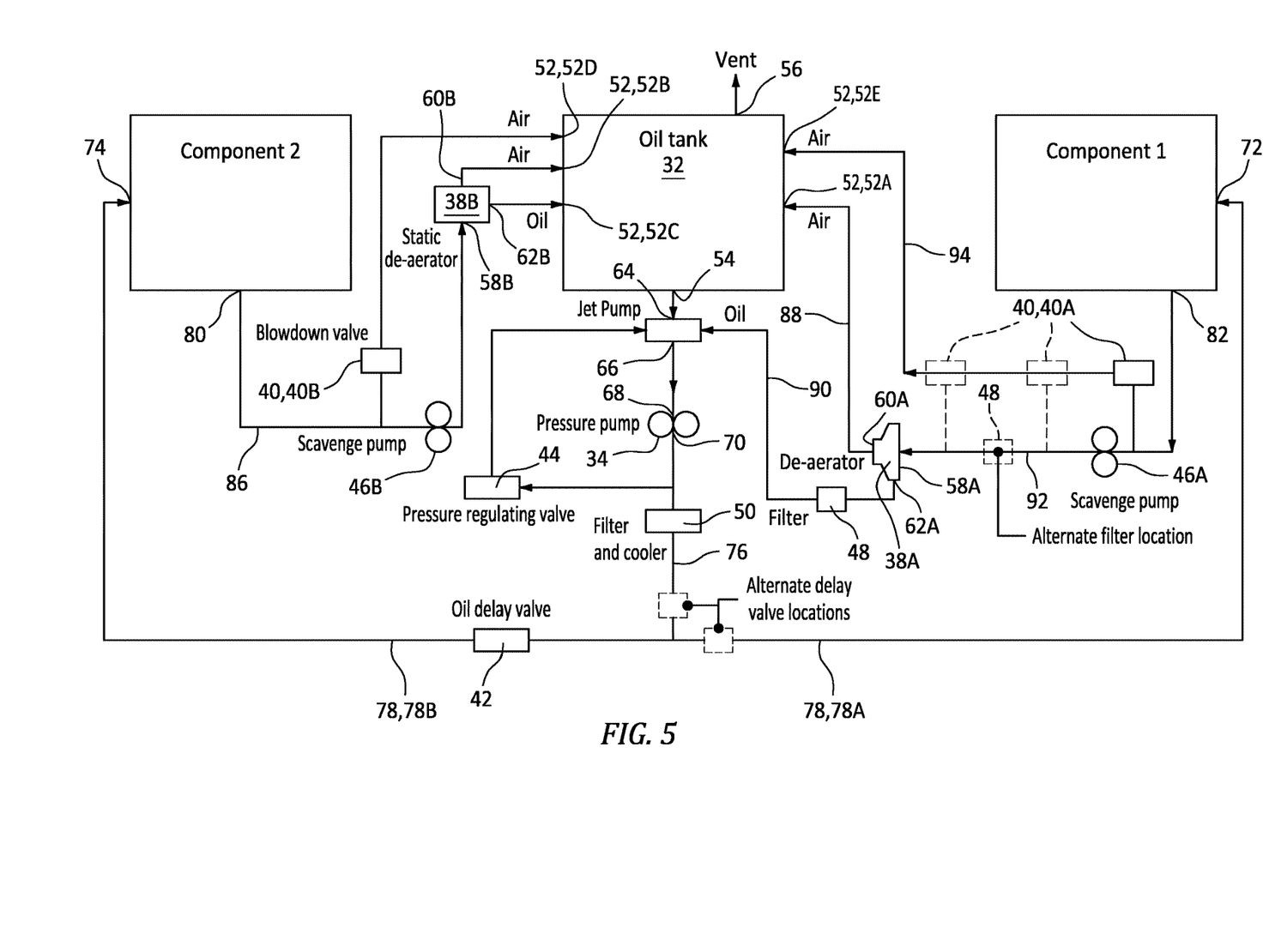
FIG. 5 is a diagrammatic illustration of a present disclosure lubrication system embodiment.

FIGS. 4 and 5 diagrammatically illustrate non-limiting embodiments of a present disclosure aircraft engine lubrication system 30. The system 30 embodiments may include components including an oil tank 32, a pressure pump 34, a make-up pump 36, a de-aerator 38, a blowdown valve 40, an oil delay valve 42, a pressure regulating valve (PRV) 44, a scavenge pump 46, and one or more fluid filters 48, and/or combination filter/coolers 50.

The lubrication system 30 is configured to service one or more engine components, including but not limited to, gears, bearings, journal bearings, or static elements such as internal cavity walls. The present disclosure system 30 is not limited to servicing any particular type of engine component. To facilitate the description herein, the engine components will be referred to generically as Component 1 and Component 2.

The oil tank 32 is a reservoir configured to hold a volume of lubricant. The oil tank 32 has at least one fluid inlet 52, at least one fluid outlet 54, and a gas (e.g., air) vent 56. The size and configuration of the oil tank 32 may vary depending on the system 30; e.g., the fluid volume capacity of the oil tank 32 may vary depending on the application, and the geometric configuration of the oil tank 32 may vary depending on the application. The diagrammatic representation in the FIGURES of the oil tank 32 as a square vessel is for diagrammatic purposes only. Typically, the fluid inlet 52 is disposed gravitationally above the fluid outlet 54.

The pressure pump 34 and the make-up pump 36 may each be a positive displacement pump such as a geared pump. The pressure pump 34 and/or the make-up pump 36 may be in mechanical communication with the engine; e.g., via a gearbox. In those embodiments that include a scavenge pump 46, the scavenge pump 46 may also be a mechanically driven positive displacement pump. The present disclosure is not limited to any particular type of pressure pump 34, make-up pump 36, or scavenge pump 46; e.g., electrically driven positive placement pumps may be used. In those embodiments that include a make-up pump 36 in the form of a jet pump, the jet pump may utilize a Venturi effect to generate suction and draw fluid through the pump.

The de-aerator 38 passively or actively causes a separation of entrained air from the oil passing to the de-aerator 38 from the component. An example of a passive de-aerator as that term is used herein is a de-aerator that does not use an impeller, but rather uses for example a helical passage that allows centrifugal force to separate oil from air. Passive de-aerators are known, and the present disclosure is not limited to any particular type. An example of an active de-aerator as that term is used herein is a de-aerator that uses an impeller (either driven or freewheeling). Active de-aerators are known, and the present disclosure is not limited to any particular type. The de-aerator 38 includes an inlet 58 through which fluid (that may have a substantial percentage of air, entrained and/or mixed with the oil) may pass, a gas outlet 60 through which entrained air separated from the inlet fluid may pass, and a liquid outlet 62 through which fluid less the removed entrained air may pass. The efficiency of the de-aerator 38 (i.e., the degree to which it removed entrained air) may vary. As will be detailed herein, in some embodiments a de-aerator 38 may be a static (i.e., non-powered) type or may be an active type which is mechanically, electrically, or hydraulically powered.

A blowdown valve 40 as may be used in a system 30 embodiment is a directional valve that permits one-way passage of a fluid. Non-limiting examples of such valves include ball valves, puppet valves, and the like.

A filter 48 as may be used in a system 30 embodiment is a device configured to remove contaminants (e.g., unwanted particulate matter) from the lubricant flow.

A filter/cooler 50 as may be used in a system 30 embodiment includes a filter element as described above and may be further configured to remove thermal energy from the lubricant flow.

Components within the present disclosure system 30 embodiments may be connected to one another by a respective fluid line; e.g., a pipe, a tube, or the like configured to contain and permit passage of a fluid therethrough. The term "in fluid communication" is used herein to mean that a fluid line extends between the named components and is configured to contain a fluid flow between the components.

FIG. 4 diagrammatically illustrates an embodiment of a present disclosure aircraft engine lubrication system 30. In this embodiment, the system 30 includes an oil tank 32, a pressure pump 34, a make-up pump 36, and a de-aerator 38. FIG. 4 also shows a scavenge pump 46 that may optionally be included. FIG. 4 diagrammatically illustrates the lubrication system 30 in communication with two engine components, namely Component 1 and Component 2. The inlet 64 of the make-up pump 36 is in fluid communication with the outlet 54 of the oil tank 32 and the outlet 66 of the make-up pump 36 is in fluid communication with the inlet 68 of the pressure pump 34. The outlet 70 of the pressure pump 34 is in fluid communication with an inlet 72 of Component 1 and with an inlet 74 of Component 2. More specifically, the outlet 70 of the pressure pump 34 is in fluid communication with a fluid line 76 that intersects with a supply fluid line 78 that extends between Component 1 and Component 2. A first portion 78A of the supply fluid line 78 extends from the intersection to Component 1, and a second portion 78B of the supply fluid line 78 extends from the intersection to Component 2. The outlet 80 of Component 2 is in fluid communication with a second inlet 52B of the oil tank 32. The outlet 82 of Component 1 is in fluid communication with the de-aerator 38. As indicated above, a scavenge pump 46 may be included (e.g., in-line) to facilitate the flow of oil from the outlet 82 of Component 1 to the de-aerator 38. In this embodiment, the de-aerator 38 may be a static de-aerator or an active de-aerator. The gas outlet 60 of the de-aerator 38 is in fluid communication with a first inlet 52A of the oil tank 32. The liquid outlet 62 of the de-aerator 38 is in fluid communication with the fluid line 84 extending between the outlet 66 of the make-up pump 36 and the inlet 68 of the pressure pump 34.

In the operation of the present disclosure aircraft engine lubrication system 30 shown in FIG. 4, oil is pumped by the pressure pump 34 into both Component 1 and Component 2. Within the interaction between the oil and the respective engine component, air may become entrained within the oil. Hence, the generic description of oil being pumped into "Component 1" or "Component 2" contemplates that during the interaction between the oil and a component/cavity, air may become entrained within the oil. It should be noted, however, that the entrainment of air within oil may occur elsewhere within the lubrication system 30 other than within a component/cavity.

Oil exits the outlet 80 of Component 2 and passes to the second inlet 52B of the oil tank 32. In this embodiment, the oil passing between Component 2 and the oil tank 32 is not subject to purposeful de-aeration. Hence, the oil entering the oil tank 32 from Component 2 may include some amount of entrained air. The aforesaid entrained air may separate from the oil while that oil dwells within the oil tank 32. As stated above, the oil tank 32 includes a gas vent 56 that permits air within the oil tank 32 to be vented out of the lubrication system 30.

Oil exits the outlet 82 of Component 1 and is passed to the inlet 58 of the de-aerator 38. As indicated above, a scavenge pump 46 may be included (e.g., in-line) to facilitate the flow of oil from the outlet 82 of Component 1 to the de-aerator 38.

The de-aerator 38 passively or actively causes a separation of entrained air from the oil passing to the de-aerator 38 from Component 1. The separated air passes from the de-aerator gas outlet 60 to the first inlet 52A of the oil tank 32 and into the oil tank 32. The separated oil (i.e., the oil that has been processed to remove at least some of the entrained air) passes from the de-aerator liquid outlet 62 to the fluid line 84 extending between the outlet 66 of the make-up pump 36 and the inlet 68 of the pressure pump 34. The pressure pump 34, in turn, pumps the oil from Component 1 back into the system 30 to repeat the cycle.

In the manner described above, a portion of the system oil is passed through the de-aerator 38 during a given flow cycle and the remainder of the oil is passed back to the oil tank 32. The make-up pump 36 is operated to impose a direction of flow from the de-aerator liquid outlet 62 to the inlet 68 of the pressure pump 34 and thereby avoid liquid flow into the oil tank 32 from the de-aerator liquid outlet 62. A benefit of this system 30 embodiment is that it reduces the dwell time induced volume of oil within the oil tank 32. Another benefit of this system 30 embodiment is that it forms a quasi-closed loop for oil flow through Component 1. As detailed above, in an aircraft application, the gravity vector for oil in a tank or cavity (e.g., oil tank 32 or Component 1) may not always point towards the tank/cavity outlet. If the outlet of a tank/cavity is not covered in oil (e.g., because of the gravitational orientation of the oil-a scenario that may be referred to as "loosing"), air may be undesirably drawn into the pressure pump inlet 68 and the flow of oil to Component 1 and 2 impeded. The oil flow loop through Component 1 that bypasses the oil tank 32 in this embodiment mitigates the possibility that the pump inlet 68 ingests air in adverse acceleration scenarios.

FIG. 5 diagrammatically illustrates an embodiment of a present disclosure aircraft engine lubrication system 30. In this embodiment, the system 30 includes an oil tank 32, Component 1, Component 2, blowdown valves 40A, 40B, a first de-aerator 38A, a second de-aerator 38B, a make-up pump 36 in the form of a jet pump, a pressure pump 34, an oil delay valve 42, a pressure regulating valve (PRV) 44, a first scavenge pump 46A, a second scavenge pump 46B, and one or more oil filter 48, and/or combination filter/coolers 50. Unless specifically stated herein, the system 30 embodiment shown in FIG. 5 does not require all of the components shown in FIG. 5; e.g., more, or fewer filters 48 may be used, one or both scavenge pumps 46 may not be included, and the like. In addition, the jet pump 36 may provide several benefits (e.g., lower cost, less weight, power efficiency, and the like) but is not specifically required; e.g., a positive displacement make-up pump 36 may be used in place of the jet pump.

In the system 30 diagrammatically shown in FIG. 5, the outlet 54 of the oil tank 32 is in fluid communication with the inlet 64 of the jet pump 36 and the outlet 66 of the jet pump 36 is in fluid communication with the inlet 68 of the pressure pump 34. The outlet 70 of the pressure pump 34 is in fluid communication with an inlet 72 of Component 1 and an inlet 74 of Component 2. More specifically, the outlet 70 of the pressure pump 34 is in fluid communication with a fluid line 76 that intersects with a supply fluid line 78 that extends between Component 1 and Component 2. A first portion 78A of the supply fluid line extends from the intersection to Component 1, and a second portion 78B of the supply fluid line 78 extends from the intersection to Component 2. The PRV 44 is disposed across the pressure pump 34 and in communication with the jet pump 36. A filter/cooler 50 is disposed in-line with the outlet 70 of the pressure pump 34. The outlet 80 of Component 2 is in fluid communication with the second de-aerator 38B. The second scavenge pump 46B is shown disposed in-line between the outlet 80 of Component 2 and the inlet 58B of the second de-aerator 38B. The gas outlet 60B of the second de-aerator 38B is in fluid communication with a second inlet 52B of the oil tank 32. The liquid outlet 62B of the second de-aerator 38B is in fluid communication with a third inlet 52C of the oil tank 32. A second blowdown valve 40B is in fluid communication with the fluid line 86 that extends between the outlet 80 of Component 2 and the second scavenge pump 46B, and a fourth inlet 52D of the oil tank 32. In FIG. 5, the oil delay valve 42 is disposed in-line within the second portion 78B of the supply fluid line 78. FIG. 5 also shows in phantom line that the oil delay valve 42 may alternatively be disposed in the fluid line 76 extending between the pressure pump 34 and the supply fluid line 78 or may be disposed in the first portion 78A of the supply fluid line 78. The outlet 82 of Component 1 is in fluid communication with the inlet 58A of the first de-aerator 38A. The gas outlet 60A of the first de-aerator 38A is in fluid communication with a first inlet 52A of the oil tank 32 via a fluid line 88. The liquid outlet 62A of the first de-aerator 38A is in fluid communication with an inlet of the jet pump 36. A filter 48 may be disposed in-line with the fluid line 90 extending between the fluid outlet 62A of the first de-aerator 38A and the inlet of the jet pump 36. The system 30 shown in FIG. 5 shows the first scavenge pump 46A disposed in-line between the outlet 82 of Component 1 and the first de-aerator 38A. A first blowdown valve 40A may be included having an inlet disposed in fluid communication with the fluid line 92 extending between the outlet 82 of Component 1 and the first de-aerator 38A, and an outlet in fluid communication with the fluid line 94 extending to the fifth inlet 52E of the oil tank 32. FIG. 5 shows the inlet line of the first blowdown valve disposed upstream of the first scavenge pump 46A. FIG. 5 also shows alternatives (in dashed line), including the first blowdown valve 40A disposed downstream of the first scavenge pump 46A, or downstream of both the first scavenge pump 46A and a filter 48 (shown as optional).

In the operation of the present disclosure system 30 shown in FIG. 5, oil is pumped by the pressure pump 34 into both Component 1 and Component 2. Oil exiting the pressure pump 34 passes through the filter/cooler 50 prior to passing into Component 1 and Component 2. The PRV 44 disposed across the pressure pump 34 is used to regulate the fluid pressure across the pressure pump 34. Oil entering the second portion 78B of the supply fluid line 78 for passage to Component 2 encounters the oil delay valve 42. The oil delay valve 42 is operable to stop the oil flow to Component 2 under certain circumstances; e.g., in negative gravity circumstances, and the like. In fact, the oil delay valve 42 may be utilized to provide several benefits. For example, the oil delay valve 42 may be operated to a closed configuration to prevent oil seepage out of Component 2 under certain operational circumstances such as may occur in an acceleration from shutdown to ground idle and deacceleration. When the oil delay valve 42 is closed preventing the flow of oil to Component 2, the system 30 may be described as being a quasi-closed loop for Component 1. When the system 30 is configured as a quasi-closed loop for Component 1 (i.e., when the oil delay valve 42 is closed), the entire capacity of the pressure pump 34 is selectively available to Component 1. As a result, a higher oil flow/oil pressure can be selectively maintained relative to Component 1.

When there is a flow of oil through to Component 2, the oil exits the Component 2 outlet 80 and passes to the second de-aerator 38B. The oil flow between Component 2 and the second de-aerator 38B may be assisted by the second scavenge pump 46B. The second de-aerator 38B is shown as a static de-aerator. Entrained air separated within the second de-aerator 38B is passed into the oil tank 32 via the second inlet 52B of the oil tank 32. The separated oil is passed into the oil tank 32 via the third inlet 52C of the oil tank 32. The second blowdown valve 40B (disposed between the outlet 80 of Component 2 and the fourth inlet 52D of the oil tank 32) permits air to escape into the oil tank 32.

Oil exiting the outlet 82 of Component 1 passes to the first de-aerator 38A. The oil flow between Component 1 and the first de-aerator 38A may be assisted by the first scavenge pump 46A. The first de-aerator 38A may be a static de-aerator or an active de-aerator. Entrained air separated within the first de-aerator 38A is passed into the oil tank 32 via the first inlet 52A of the oil tank 32. The separated oil is passed from the liquid outlet 62A of the first de-aerator 38A to the jet pump 36. A filter 48 may be disposed in-line between the first de-aerator 38A and the jet pump 36.

The jet pump 36 is operated to impose a direction of flow from the de-aerator liquid outlet 62 to the inlet 68 of the pressure pump 34 and thereby avoid liquid flow into the oil tank 32 from the de-aerator liquid outlet 62. At high altitudes, a gear-type pump may be subject to cavitation as the oil tank pressure is likely lower than the cavitation threshold. Jet pumps, in contrast, are not subject to cavitation under normal operation. Hence, in a high-altitude operation a jet pump may provide operational advantages.

In the system 30 embodiment shown in FIG. 5 (like that shown in FIG. 4), only a portion of the system oil is passed back into the oil tank 32 during a given flow cycle. Oil from the jet pump 36 and oil from the liquid outlet 62A of the first de-aerator 38A are provided to the pressure pump 34 at a flow rate that substantially maintains a uniform collective oil flow within the lubrication system 30. Depending on the operating parameters, oil may cycle through the PRV 44 and into the jet pump 36 to regulate the fluid pressure across the pressure pump 34.

A benefit of this system 30 embodiment is that it reduces the dwell time induced volume of oil within the oil tank 32, given that only a portion of the collective oil flow is returned to the oil tank 32. Another benefit of this system 30 embodiment, including the oil delay valve 42, is that it forms a closed loop for oil flow (e.g., in a negative gravity condition) through Component 1 and the potential for loosing is mitigated. Moreover, because the pressure pump 34 volumetric capacity is greater than the flow passing through the first de-aerator 38A, in a negative gravity condition the pressure pump 34 will provide an air-oil mixture within the system 30. Although not passing 100% de-aerated oil, the partial de-aeration in the Component 1 loop allows 100% of what is scavenged from Component 1 to be cycled within loop.

A present disclosure aircraft engine lubrication system 30 embodiment like that shown in FIG. 5 and described herein, may be used to protect an oil sensitive cavity/component, or a high oil cavity/component consumer, for bigger impact on the engine. Also, the isolation of an oil sensitive cavity/component (e.g., Component 1 in the FIG. 5 embodiment) by an oil delay valve in a system 30 where the de-aerator 38 only sees the flow from the isolated cavity/component permits the de-aerator 38 efficiency to be improved in contrast to a system wherein all of the return oil flow must pass through a single de-aerator prior to returning to the pressure pump.

Embodiments of the present disclosure may be used to retrofit existing lubrication systems.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An aircraft engine lubrication system for an aircraft engine having a first component (FC) with an FC inlet and an FC outlet, and a second component (SC) having a SC inlet and a SC outlet, wherein the first component and the second component are a gearbox or a bearing cavity, the system comprising:
  a lubricant tank (LT) configured to contain a volume of lubricant, the lubricant tank having a LT first inlet, a LT second inlet, and a LT outlet;
  a first pump (FP) having a FP inlet and a FP outlet;
  a second pump (SP) having a SP inlet and a SP outlet;
  a de-aerator (DA) having a DA inlet, a DA gas outlet, and a DA liquid outlet;
  wherein the LT outlet is in fluid communication with the FP inlet, the FP outlet is in fluid communication with the SP inlet, and the SP outlet is in fluid communication with the FC inlet and the SC inlet such that lubricant exiting the second pump passes to the first component and to the second component;
  wherein the SC outlet is in fluid communication with the LT first inlet such that lubricant exiting the second component passes to the lubricant tank without passing through the de-aerator;
  wherein the FC outlet is in fluid communication with the de-aerator, the DA gas outlet is in fluid communication with the LT second inlet such that gas exiting the de-aerator passes to the lubricant tank, and the DA liquid outlet is in fluid communication with the SP inlet such that the lubricant exiting the de-aerator passes to the second pump, bypassing the lubricant tank,
  wherein all lubricant exiting the de-aerator passes to the second pump and bypasses the lubricant tank.

2. The system of claim 1, wherein the de-aerator is a static de-aerator.

3. The system of claim 1, wherein the de-aerator is an active de-aerator.

4. The system of claim 1, wherein the second pump is a positive displacement pump.

5. The system of claim 1, further comprising a scavenge pump in fluid communication with the FC outlet and the DA inlet such that lubricant flows from the FC outlet through the scavenge pump to the DA inlet.

6. The system of claim 1, wherein a fluid line extends between the FP outlet and the SP inlet and the DA liquid outlet is in fluid communication with the fluid line.

7. A method of selectively operating the aircraft engine lubrication system of claim 1, the method comprising:
  pumping the lubricant from the lubricant tank using the first pump, and pumping the lubricant to the second pump from the first pump;
  using the second pump to pump the lubricant to the first component (FC) and to the second component (SC);
  returning the lubricant from the second component to the lubricant tank without passing through the de-aerator;
  directing the lubricant from the first component to the de-aerator;
  using the de-aerator to separate the lubricant into a separated gas component and a separated liquid component;
  directing the separated gas component to the lubricant tank; and
  directing the separated liquid component to the SP inlet, bypassing the lubricant tank.

8. The method of claim 7, wherein a quasi-closed lubricant loop for the first component is formed by the second pump pumping the lubricant to the first component, directing the lubricant from the first component to the de-aerator, and directing the separated liquid component to the SP inlet.

9. The method of claim 7, wherein the step of returning the lubricant from the second component to the lubricant tank includes passing the lubricant from the second component through a second de-aerator.

10. The method of claim 9, further comprising selectively operating an oil delay valve in an open configuration or a closed configuration, wherein in the open configuration lubricant from the second pump passes from the second pump to the second component, and wherein in the closed configuration lubricant from the second pump does not pass from the second pump to the second component.

11. The method of claim 10, wherein operating the oil delay valve in a closed configuration produces a quasi-closed lubricant loop for the first component.

* * * * *